(12) United States Patent
Farandos et al.

(10) Patent No.: US 11,777,126 B2
(45) Date of Patent: *****Oct. 3, 2023

(54) METHODS OF MAKING AND USING AN OXIDE ION CONDUCTING MEMBRANE

(71) Applicant: Utility Global, Inc., Houston, TX (US)

(72) Inventors: Nicholas Farandos, Greystones (IE); Matthew Dawson, Katy, TX (US); Jin Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/111,602

(22) Filed: Dec. 4, 2020

(65) Prior Publication Data

US 2021/0175531 A1    Jun. 10, 2021

Related U.S. Application Data

(60) Provisional application No. 62/944,259, filed on Dec. 5, 2019, provisional application No. 62/944,756, filed
(Continued)

(51) Int. Cl.
*H01M 8/1253* (2016.01)
*H01M 8/1246* (2016.01)
(Continued)

(52) U.S. Cl.
CPC .......... *H01M 8/1253* (2013.01); *C01B 3/382* (2013.01); *C01B 3/386* (2013.01); *H01M 8/126* (2013.01);
(Continued)

(58) Field of Classification Search
CPC .. H01M 8/1253; H01M 8/1246; H01M 8/126; H01M 2008/1293;
(Continued)

(56) References Cited

U.S. PATENT DOCUMENTS 3,635,812 A   1/1972   Spacil
3,974,108 A   8/1976   Staut et al.
(Continued)

FOREIGN PATENT DOCUMENTS

CN    100536213 C  *  9/2009   ............. H01M 8/04
IN    668/DELNP/2011 A    2/2012
(Continued)

OTHER PUBLICATIONS

International Search Report and Written Opinion in International Patent Application No. PCT/US2020/013133 dated Apr. 14, 2020 (9 pages).
(Continued)

*Primary Examiner* — Kaity V Chandler
(74) *Attorney, Agent, or Firm* — Foley & Lardner LLP (57) ABSTRACT

Herein discussed is a method of using an oxide ion conducting membrane comprising exposing the oxide ion conducting membrane to a reducing environment on both sides of the membrane. In an embodiment, the oxide ion conducting membrane also conducts electrons. In various embodiments, the membrane is impermeable to fluid flow (e.g., having a permeability of less than 1 micro darcy). In an embodiment, the oxide ion conducting membrane comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the membrane is mixed conducting.

11 Claims, 3 Drawing Sheets

Related U.S. Application Data on Dec. 6, 2019, provisional application No. 62/970,655, filed on Feb. 5, 2020, provisional application No. 63/084,925, filed on Sep. 29, 2020.

(51) Int. Cl.
  *H01M 8/126* (2016.01)
  *C01B 3/38* (2006.01)
  *H01M 8/12* (2016.01)

(52) U.S. Cl.
  CPC .. *H01M 8/1246* (2013.01); *H01M 2008/1293* (2013.01); *H01M 2300/0077* (2013.01); *H01M 2300/0091* (2013.01)

(58) Field of Classification Search
  CPC . H01M 2300/0077; H01M 2300/0091; H01M 8/0606; H01M 2300/0074; C01B 3/382; C01B 3/386; Y02E 60/36; Y02E 60/50
  See application file for complete search history.

(56) References Cited

U.S. PATENT DOCUMENTS

| | | | |
|---|---|---|---|
| 4,574,112 A | 3/1986 | Breault et al. | |
| 4,799,936 A | 1/1989 | Riley | |
| 4,978,589 A | 12/1990 | Shiozawa et al. | |
| 5,212,023 A | 5/1993 | Diethelm | |
| 5,290,642 A | 3/1994 | Minh et al. | |
| 5,725,965 A * | 3/1998 | Wachsman | H01M 8/1246 |
| | | | 429/495 |
| 6,054,229 A | 4/2000 | Hsu et al. | |
| 6,090,500 A * | 7/2000 | Ishihara | H01M 4/9033 |
| | | | 429/218.2 |
| 6,287,432 B1 * | 9/2001 | Mazanec | C01G 49/0072 |
| | | | 204/266 |
| 6,793,711 B1 * | 9/2004 | Sammells | C01B 3/38 |
| | | | 585/818 |
| 2001/0002990 A1 * | 6/2001 | MacKay | B01J 4/04 |
| | | | 423/594.1 |
| 2002/0004152 A1 | 1/2002 | Clawson et al. | |
| 2002/0028367 A1 | 3/2002 | Sammes et al. | |
| 2002/0132156 A1 | 9/2002 | Ruhl et al. | |
| 2003/0016638 A1 | 1/2003 | Philips | |
| 2003/0134171 A1 | 7/2003 | Sarkar et al. | |
| 2003/0155254 A1 * | 8/2003 | Mazanec | C25B 5/00 |
| | | | 204/266 |
| 2003/0190503 A1 | 10/2003 | Kumar et al. | |
| 2003/0235731 A1 | 12/2003 | Haltiner et al. | |
| 2004/0001994 A1 | 1/2004 | Marina et al. | |
| 2004/0166380 A1 | 8/2004 | Gorte et al. | |
| 2005/0053819 A1 | 3/2005 | Paz | |
| 2005/0164051 A1 | 7/2005 | Venkataraman et al. | |
| 2006/0016805 A1 | 1/2006 | Del Regno | |
| 2006/0147370 A1 | 7/2006 | Mathias et al. | |
| 2006/0280998 A1 | 12/2006 | Ying et al. | |
| 2007/0166579 A1 | 7/2007 | Kim et al. | |
| 2007/0217995 A1 | 9/2007 | Matsumura et al. | |
| 2009/0098438 A1 * | 4/2009 | Kunitake | C03C 3/06 |
| | | | 429/409 |
| 2009/0208784 A1 | 8/2009 | Perry et al. | |
| 2009/0235587 A1 | 9/2009 | Hawkes et al. | |
| 2009/0259343 A1 | 10/2009 | Rasmussen et al. | |
| 2010/0086824 A1 | 4/2010 | Homel et al. | |
| 2010/0098996 A1 | 4/2010 | Hwang et al. | |
| 2011/0039179 A1 | 2/2011 | Suh et al. | |
| 2011/0086293 A1 | 4/2011 | Kong et al. | |
| 2012/0329659 A1 | 12/2012 | Holcomb | |
| 2013/0026032 A1 | 1/2013 | Pal et al. | |
| 2013/0082421 A1 | 4/2013 | Allemand et al. | |
| 2013/0344383 A1 | 12/2013 | Loveness et al. | |
| 2014/0314613 A1 | 10/2014 | Hopkinson et al. | |
| 2015/0167186 A1 | 6/2015 | Hirata et al. | |
| 2015/0364782 A1 | 12/2015 | Tsukamoto | |
| 2016/0028096 A1 | 1/2016 | Vesely et al. | |
| 2016/0129417 A1 | 5/2016 | Aimone et al. | |
| 2016/0131443 A1 | 5/2016 | Oliva et al. | |
| 2016/0293980 A1 | 10/2016 | Morikawa et al. | |
| 2016/0329582 A1 | 11/2016 | Buxbaum | |
| 2017/0012319 A1 | 1/2017 | Anandan et al. | |
| 2017/0205149 A1 | 7/2017 | Herring et al. | |
| 2018/0202055 A1 | 7/2018 | Reytier et al. | |
| 2018/0212083 A1 | 7/2018 | Kim et al. | |
| 2018/0363150 A1 * | 12/2018 | Alvarez | C25B 1/00 |

FOREIGN PATENT DOCUMENTS

| | | | | |
|---|---|---|---|---|
| JP | H11-016585 A | | 1/1999 | |
| JP | 2000251533 A | * | 9/2000 | ............. Y02E 60/50 |
| JP | 2004058028 A | * | 2/2004 | ......... B01D 53/8631 |
| JP | 2004-284875 A1 | | 10/2004 | |
| JP | 2013-094705 A | | 5/2013 | |
| JP | 2014-069989 A | | 4/2014 | |
| JP | 2015213050 A | * | 11/2015 | ............... C25B 1/02 |
| KR | 10-2006-0024244 A | | 3/2006 | |
| KR | 10-2014-0050093 A | | 4/2014 | |
| RU | 2670423 C2 | * | 10/2018 | ............... B05D 5/12 |
| TW | 201138199 A | | 11/2011 | |
| WO | WO-2014145054 A1 | * | 9/2014 | ......... H01M 8/0202 |

OTHER PUBLICATIONS

International Search Report and Written Opinion in International Patent Application No. PCT/US2020/052277 dated Jan. 8, 2021.
International Search Report and Written Opinion on International Patent Application No. PCT/US2019/065247 dated Feb. 24, 2020 (7 pages).
International Search Report and Written Opinion on PCT Appl. Ser. No. PCT/US2019/065255 dated Feb. 5, 2020 (7 pages).
International Search Report and Written Opinion on PCT Appl. Ser. No. PCT/US2019/065261 dated Feb. 11, 2020 (8 pages).
International Search Report and Written Opinion on PCT Appl. Ser. No. PCT/US2020/013121 dated Mar. 25, 2020 (8 pages).
International Search Report and Written Opinion on PCT Appl. Ser. No. PCT/US2020/013126 dated Apr. 1, 2020 (7 pages).
International Search Report and written Opinion on PCI Appl. Ser. No. PCT/US2020/013129 dated Mar. 19, 2020 (8 pages).
International Search Report and Written Opinion on PCT Appl. Ser. No. PCT/US2020/015492 dated Apr. 24, 2020 (7 pages).
International Search Report and Written Opinion on PCT Appl. Ser. No. PCT/US2020/063666 dated Apr. 6, 2021 (12 pages).
Kharton, et al., "Mixed electronic and ionic conductivity of LaCo(M)O3 (M=Ga, Cr, Fe or Ni) I. Oxygen transport in pervoskites LaCoO3-LaGaO3.," Solid State Ionics, 1997, vol. 104 (pp. 67-78).
Thompson, et al., "Additive Manufacturing of Heat Exchangers: A case study on a multi-layered Ti-6AI-4V oscillating heat pipe," Abstract only, URL: https://www.sciencedirect.com/science/article/pii/S2214860415000469.
Wang, et al., "Electrical and Ionic Conductivity of Gd-Doped Ceria," Journal of Electrochemical Society, 2000, vol. 147, No. 10 (pp. 3606-3609).

* cited by examiner

METHODS OF MAKING AND USING AN OXIDE ION CONDUCTING MEMBRANE

CROSS-REFERENCE TO RELATED APPLICATIONS

This application claims the benefit under 35 U.S.C. 119(e) of U.S. Provisional Patent Application No. 62/944,259, filed Dec. 5, 2019, U.S. Provisional Patent Application No. 62/944,756 filed Dec. 6, 2019, U.S. Provisional Patent Application No. 62/970,655, filed Feb. 5, 2020, and U.S. Provisional Patent Application No. 63/084,925 filed Sep. 29, 2020. The entire disclosures of each of these listed applications are hereby incorporated herein by reference.

TECHNICAL FIELD

This invention generally relates to oxide ion conducting membranes. More specifically, this invention relates to methods of making and using oxide ion conducting membranes.

BACKGROUND

Solid oxide fuel cells (SOFCs) are a class of fuel cells that use a solid oxide material as the electrolyte. The anode receives a fuel, and the cathode receives an oxidant. SOFCs use a solid oxide electrolyte to conduct negative oxygen ions from the cathode to the anode. The electrochemical oxidation of the oxygen ions with fuel powers electricity generation. In addition, SOFCs do not typically require expensive platinum catalyst material, which is typically necessary for lower temperature fuel cells such as proton-exchange membrane fuel cells (PEMFCs), and are not vulnerable to carbon monoxide poisoning. The solid oxide electrolyte in an SOFC is a typical oxide ion conducting membrane. The use of SOFC is a traditional way of using oxide ion conducting membranes.

Contrary to conventional wisdom, we have discovered a new method of use for oxide ion conducting membranes—for example, to generate hydrogen. Hydrogen in large quantities is needed in the petroleum and chemical industries. For example, large amounts of hydrogen are used in upgrading fossil fuels and in the production of ammonia or methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy. Clearly, there is continuing need and interest to develop methods and systems to produce hydrogen. This disclosure also discusses methods of making such oxide ion conducting membranes.

SUMMARY

Herein discussed is a method comprising providing an oxide ion conducting membrane; and exposing the oxide ion conducting membrane to a reducing environment on both sides of the membrane. In an embodiment, the oxide ion conducting membrane also conducts electrons. In various embodiments, the membrane is impermeable to fluid flow (e.g., having a permeability of less than 1 micro darcy). In an embodiment, the oxide ion conducting membrane comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the membrane is mixed conducting.

In an embodiment, one side of the oxide ion conducting membrane is in contact with a cathode at which steam is reduced to produce hydrogen. In an embodiment, steam is electrochemically reduced to hydrogen. In an embodiment, the cathode comprises Ni or NiO and a material selected from the group consisting of YSZ, CGO, SDC, SSZ, and combinations thereof. In an embodiment, the opposite side of the oxide ion conducting membrane is in contact with an anode that receives a fuel, wherein the fuel does not mix with water-hydrogen directly. In an embodiment, the anode comprises Ni or NiO and a material selected from the group consisting of YSZ, CGO, SDC, SSZ, LSGM, and combinations thereof; or alternatively the anode comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof.

In an embodiment, the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the doped ceria comprises CGO. In an embodiment, the anode comprises lanthanum chromite and a material selected from the group consisting of doped ceria, Sc and Ce doped zirconia, and combinations thereof. In an embodiment, the fuel comprises a hydrocarbon or hydrogen or carbon monoxide or ammonia or combinations thereof.

Further disclosed herein is a method of making an oxide ion conducting membrane comprising co-sintering the oxide ion conducting membrane with a substrate comprising Ni, wherein the oxide ion conducting membrane comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In various embodiments, co-sintering takes place in a furnace or an oven.

In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the membrane is mixed conducting. In an embodiment, the substrate comprises NiO-YSZ, NiO-SSZ, NiO-CGO, NiO-SDC, or combinations thereof.

In an embodiment, the method comprises depositing lanthanum chromite in particulate form and the material in particulate form on the substrate before co-sintering. In an embodiment, depositing comprises forming a slurry of the particulates before depositing. In an embodiment, the substrate is un-sintered or at least partially sintered before depositing. In an embodiment, the oxide ion conducting membrane also conducts electrons. In an embodiment, the substrate and the membrane are tubular.

Further aspects and embodiments are provided in the foregoing drawings, detailed description and claims. Unless specified otherwise, the features as discussed herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

In this disclosure, sintering refers to a process to form a solid mass of material by heat or pressure or combination thereof without melting the material to the extent of liquefaction. For example, material particles are coalesced into a solid or porous mass by being heated, wherein atoms in the material particles diffuse across the boundaries of the particles, causing the particles to fuse together and form one solid piece.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow. For example, an impermeable layer has a permeability of less than 1 micro darcy, or less than 1 nano darcy. The electrolyte and gas seal are also impermeable layers to fluid flow. The electrolyte as an impermeable layer allows ions to pass through. In this disclosure, an interconnect having no fluid dispersing element refers to interconnect having no elements (e.g., channels) to disperse a fluid. Such an interconnect may have inlets and outlets for materials or fluids to pass through.

In this disclosure, the term "mixed conducting" refers to a material (e.g., a membrane) that is able to transport both electrons and ions. For example, the ionic conductivity may refer to oxygen ions, protons, or other ions (like halogenide or chalcogenide anions).

Syngas (i.e., synthesis gas) in this disclosure refers to a mixture consisting primarily of hydrogen, carbon monoxide, and carbon dioxide.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula $Gd:CeO_2$). CGO and GDC are used interchangeably unless otherwise specified.

Impermeable Layer

Herein discussed is a method of using an oxide ion conducting membrane comprising exposing the oxide ion conducting membrane to a reducing environment on both sides of the membrane. In an embodiment, the oxide ion conducting membrane also conducts electrons. In various embodiments, the membrane is impermeable to fluid flow (e.g., having a permeability of less than 1 micro darcy). In an embodiment, the oxide ion conducting membrane comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the membrane is mixed conducting.

In an embodiment, one side of the oxide ion conducting membrane is in contact with a cathode at which steam is reduced to produce hydrogen. In an embodiment, steam is electrochemically reduced to hydrogen. In an embodiment, the cathode comprises Ni or NiO and a material selected from the group consisting of YSZ, CGO, SDC, SSZ, and combinations thereof. In an embodiment, the opposite side of the oxide ion conducting membrane is in contact with an anode that receives a fuel, wherein the fuel does not mix with water-hydrogen directly. In an embodiment, the anode comprises Ni or NiO and a material selected from the group consisting of YSZ, CGO, SDC, SSZ, LSGM, and combinations thereof or alternatively the anode comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof. In an embodiment, the fuel comprises a hydrocarbon or hydrogen ($H_2$) or carbon monoxide (CO) or ammonia or combinations thereof.

In an embodiment, the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the doped ceria comprises CGO. In an embodiment, the anode comprises lanthanum chromite and a material selected from the group consisting of doped ceria, Sc and Ce doped zirconia, and combinations thereof. In an embodiment, the membrane and the anode have similar or same composition. In an embodiment, the membrane is gas-tight, i.e., does not allow gas to flow through. In an embodiment, the anode is porous, when in use, to allow gas flow.

Further disclosed herein is a method of making an oxide ion conducting membrane comprising co-sintering the oxide ion conducting membrane with a substrate comprising Ni, wherein the oxide ion conducting membrane comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof. For example, a substrate comprising NiO is considered as comprising Ni. In various embodiments, co-sintering takes place in a furnace or an oven.

In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the membrane is mixed conducting. In an embodiment, the substrate comprises NiO-YSZ, NiO-SSZ, NiO-CGO, NiO-SDC, or combinations thereof.

In an embodiment, the method comprises depositing lanthanum chromite in particulate form and the material in particulate form on the substrate before co-sintering. In an embodiment, depositing comprises forming a slurry of the particulates before depositing. In an embodiment, the substrate is un-sintered or at least partially sintered before depositing. In an embodiment, the oxide ion conducting membrane also conducts electrons. In an embodiment, the substrate and the membrane are tubular.

Herein also disclosed is an impermeable layer in an electrochemical reactor comprising lanthanum chromite and zirconium oxide, wherein at least a portion of the impermeable layer is in contact with an electrode in the electrochemical reactor, wherein the impermeable layer is (a) an interconnect in the reactor or (b) a gas seal in the reactor or (c) an electrolyte in the reactor when the reactor is an electrochemical gas producer or hydrogen producer. In an embodiment, the lanthanum chromite comprises undoped lanthanum chromite, strontium doped lanthanum chromite, iron doped lanthanum chromite, lanthanum calcium chromite, or combinations thereof. In an embodiment, the zirconium oxide comprises YSZ, SSZ, zirconia, or combinations thereof. In an embodiment, both lanthanum chromite and zirconium oxide percolate in the impermeable layer.

In an embodiment, the zirconium oxide is zirconia and the impermeable layer is an interconnect. In an embodiment, the zirconium oxide is YSZ or SSZ or combination thereof and the impermeable layer is an electrolyte in an electrochemical gas producer or hydrogen producer. In an embodiment, the zirconium oxide is YSZ or zirconia or combination thereof; and the impermeable layer is a gas seal. In an embodiment, the impermeable layer comprises a secondary seal that is electrically insulating. In an embodiment, the secondary seal comprises glass.

Also disclosed herein is an electrochemical reactor comprising at least one impermeable layer and at least one electrode, wherein the impermeable layer comprises lanthanum chromite and zirconium oxide and wherein at least a portion of the impermeable layer is in contact with the electrode, wherein the impermeable layer is (a) an interconnect in the reactor or (b) a gas seal in the reactor or (c) an electrolyte in the reactor when the reactor is an electrochemical gas producer or hydrogen producer. In an embodiment, the lanthanum chromite comprises undoped lanthanum chromite, strontium doped lanthanum chromite, iron doped lanthanum chromite, lanthanum calcium chromite, or combinations thereof. In an embodiment, the zirconium oxide comprises YSZ, SSZ, zirconia, or combinations thereof. In an embodiment, both lanthanum chromite and zirconium oxide percolate in the impermeable layer.

In an embodiment, the zirconium oxide is zirconia and the impermeable layer is an interconnect. In an embodiment, the zirconium oxide is YSZ or SSZ or combination thereof and the impermeable layer is an electrolyte in an electrochemical gas producer or hydrogen producer. In an embodiment, the zirconium oxide is YSZ or zirconia or combination thereof; and the impermeable layer is a gas seal. In an embodiment, the impermeable layer comprises a secondary seal that is electrically insulating. In an embodiment, the secondary seal comprises glass.

In an embodiment, the at least one impermeable layer comprises an interconnect and a gas seal in the reactor. In an embodiment, the interconnect and the gas seal have thermal expansion coefficients that are no more than 15% different. In an embodiment, the at least one impermeable layer comprises an interconnect and a gas seal and an electrolyte in the reactor. In an embodiment, the reactor is an electrochemical gas producer or hydrogen producer. In an embodiment, the interconnect and the gas seal and the electrolyte have thermal expansion coefficients that are no more than 15% different.

Further discussed herein is a method of making an impermeable layer in an electrochemical reactor comprising a) providing lanthanum chromite in particulate form; b) providing zirconium oxide in particulate form; and c) mixing the lanthanum chromite particles and zirconium oxide particles with a liquid to form a dispersion. In an embodiment, the lanthanum chromite comprises undoped lanthanum chromite, strontium doped lanthanum chromite, iron doped lanthanum chromite, lanthanum calcium chromite, or combinations thereof. In an embodiment, the zirconium oxide comprises YSZ, SSZ, zirconia, or combinations thereof. In an embodiment, the lanthanum chromite and zirconium oxide form mixed particles, wherein at least 10% or at least 20% or at least 30% of the mixed particles have a median diameter no greater than 100 nm or no greater than 50 nm or no greater than 25 nm.

In an embodiment, the method comprises d) depositing the dispersion on a substrate to form a slice; e) sintering the slice using electromagnetic radiation (EMR); and repeating steps d)-e) to make the impermeable layer. In an embodiment, the slice has a thickness of no greater than 10 microns or no greater than 5 microns or no greater than 1 micron or no greater than 0.5 micron. In an embodiment, the EMR is provided by a xenon lamp. In an embodiment, the method comprises heating the dispersion before deposition, heating the substrate that is contact with the dispersion, or combination thereof. In an embodiment, the method comprises drying the slice between steps d) and e) using a non-contact dryer. In an embodiment, the non-contact dryer comprises infrared heater, hot air blower, ultraviolet light source, or combinations thereof. In an embodiment, said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the impermeable layer is planar.

In an embodiment, the method comprises d) depositing the dispersion on a substrate; e) sintering the dispersion using an electromagnetic radiation (EMR) source or a furnace; wherein the impermeable layer is tubular. In an embodiment, the EMR source and the substrate move relative to each other. In an embodiment, the EMR source is a xenon lamp, or optionally a circular xenon lamp. In an embodiment, said depositing comprises dip coating, spraying, ultrasonic spraying, spin coating, brush coating, pasting, or combinations thereof.

In an embodiment, at least a portion of the impermeable layer is in contact with an electrode in the electrochemical reactor. In an embodiment, both lanthanum chromite and zirconium oxide percolate in the impermeable layer. In an embodiment, the zirconium oxide is zirconia and the impermeable layer is an interconnect. In an embodiment, the zirconium oxide is YSZ or SSZ or combination thereof and the impermeable layer is an electrolyte in an electrochemical gas producer or hydrogen producer. In an embodiment, the zirconium oxide is YSZ or zirconia or combination thereof and the impermeable layer is a gas seal. In an embodiment, the method comprises forming a secondary seal in the impermeable layer that is electrically insulating. In an embodiment, the secondary seal comprises glass.

In an embodiment, the impermeable layer comprises an interconnect and a gas seal in the reactor. In an embodiment, the interconnect and the gas seal have thermal expansion coefficients that are no more than 15% different. In an embodiment, the impermeable layer comprises an interconnect and a gas seal and an electrolyte in the reactor. In an embodiment, the reactor is an electrochemical gas producer or hydrogen producer. In an embodiment, the interconnect and the gas seal and the electrolyte have thermal expansion coefficients that are no more than 15% different.

In an embodiment, the lanthanum chromite and zirconium oxide form mixed particles, wherein a first 10 wt % or more of the mixed particles have an average diameter of d, a second 10 wt % or more of the mixed particles have an average diameter of at least 5×d, and a third 10 wt % or more of the mixed particles have an average diameter of at least 20×d. In an embodiment, the third 10 wt % or more of the particles have an average diameter of at least 36×d or at least 50×d or at least 100×d. In an embodiment, the second 10 wt % or more of the particles have an average diameter of at least 6×d or at least 7×d or at least 8×d or at least 10×d. In an embodiment, a first 20 wt % or more of the particles have an average diameter of d, a second 20 wt % or more of the particles have an average diameter of at least 5×d, and a third 20 wt % or more of the particles have an average diameter of at least 20×d. In an embodiment, a first 30 wt % or more of the particles have an average diameter of d, a second 30 wt % or more of the particles have an average diameter of at least 5×d, and a third 30 wt % or more of the particles have an average diameter of at least 20×d. In an embodiment, the second 10 wt % or more of the particles have an average diameter of at least 6×d and the third 10 wt % or more of the particles have an average diameter of at least 36×d. In an embodiment, the second 10 wt % or more of the particles have an average diameter of at least 7×d or 8×d and the third 10 wt % or more of the particles have an average diameter of at least 50×d. In an embodiment, the second 10 wt % or more of the particles have an average diameter of at least 10×d and the third 10 wt % or more of the particles have an average diameter of at least 100×d. In an embodiment, d is in the range of from 1 nm to 100 nm or from 5 nm to 50 nm or from 10 nm to 30 nm. In an embodiment, the average particle diameter is determined by dynamic light scattering or electron microscopy.

In an embodiment, said liquid comprises water and at least one organic solvent miscible with water; or wherein said liquid comprises water, a surfactant, a dispersant, and no polymeric binder. In an embodiment, said liquid comprises one or more organic solvents and no water. In an embodiment, the organic solvent is selected from the group consisting of methanol, ethanol, butanol, isopropyl alcohol, terpineol, diethyl ether, 1,2-dimethoxyethane (DME or ethylene glycol dimethyl ether), 1-propanol (n-propanol or n-propyl alcohol), butyl alcohol, ethylene glycol, propylene glycol, dipropylene glycol, and combinations thereof.

Hydrogen Producer

Figure 1:
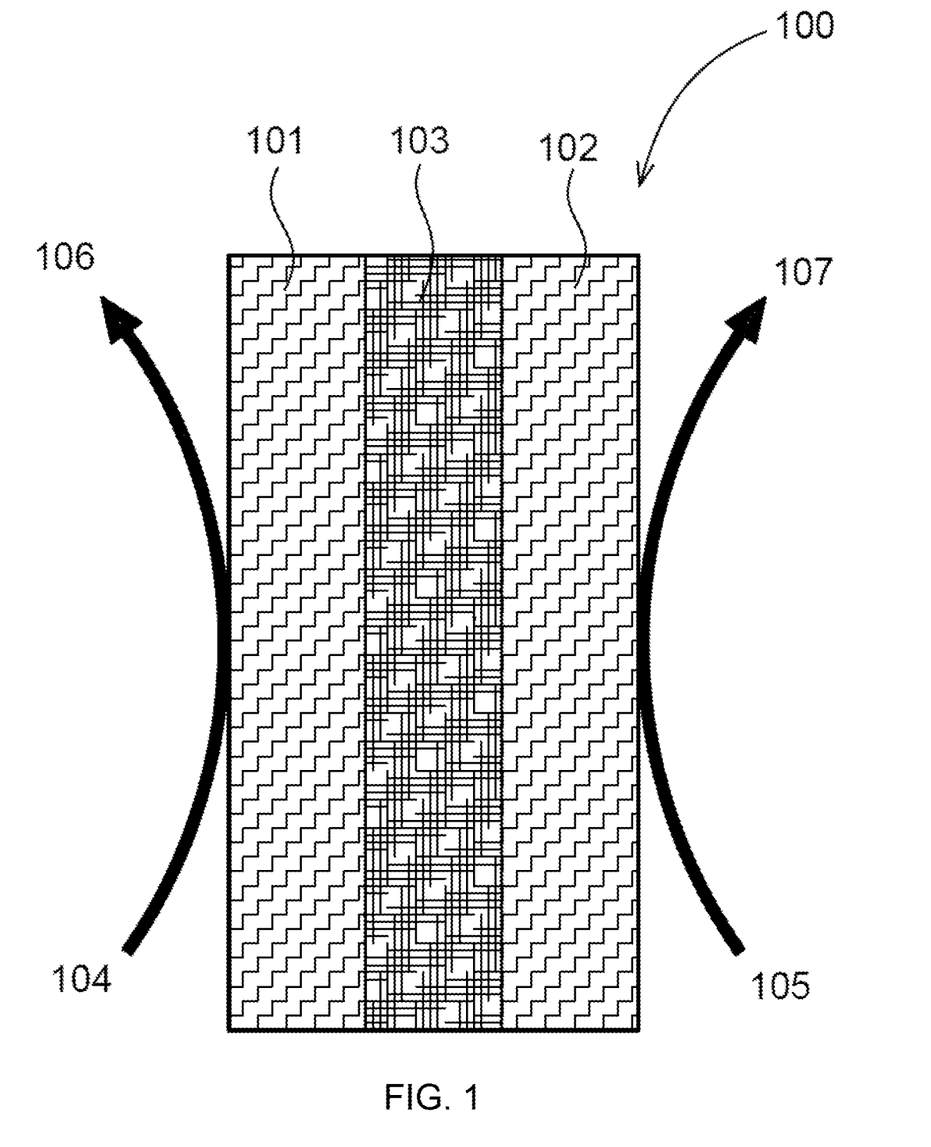
FIG. 1 illustrates a hydrogen producer or an electrochemical (EC) gas producer comprising an oxide ion conducting membrane, according to an embodiment of this disclosure.

FIG. 1 illustrates a hydrogen producer or an electrochemical (EC) gas producer 100, according to an embodiment of this disclosure. EC gas producer device 100 comprises first electrode 101, electrolyte 103 a second electrode 102. First electrode 101 is configured to receive a fuel and no oxygen 104. Second electrode 102 is configured to receive water as denoted by arrow 105.

In an embodiment, device 100 is configured to receive CO, i.e., carbon monoxide (104) and to generate $CO/CO_2$ (106) at the first electrode (101); device 100 is also configured to receive water or steam (105) and to generate hydrogen (107) at the second electrode (102). In some cases, the second electrode receives a mixture of steam and hydrogen. In various embodiments, 103 represents an oxide ion conducting membrane and both sides of the membrane is exposed to a reducing environment. In an embodiment, the first electrode 101 and the second electrode 102 may comprise Ni-YSZ or NiO-YSZ. In an embodiment, the oxide ion conducting membrane 103 also conducts electrons and thus is different from the traditional meaning of an electrolyte. Nonetheless, 103 is referred to as a membrane or an electrolyte interchangeably unless otherwise specified. The hydrogen producer as discussed herein is an example of using an oxide ion conducting membrane (i.e. 103) comprising exposing the oxide ion conducting membrane to a reducing environment on both sides.

In an embodiment, device 100 is configured to simultaneously produce hydrogen 107 from the second electrode 102 and syngas 106 from the first electrode 101. In an embodiment, 104 represents methane and water or methane and carbon dioxide entering device 100. In other embodiments, 103 represents an oxide ion conducting membrane. In an embodiment, first electrode 101 and second electrode 102 may comprise Ni-YSZ or NiO-YSZ. Arrow 104 represents an influx of hydrocarbon and water or hydrocarbon and carbon dioxide. Arrow 105 represents an influx of water or water and hydrogen. In some embodiments, electrode 101 comprises Cu-CGO, or further optionally comprises CuO or $Cu_2O$ or combination thereof. Electrode 102 comprises Ni-YSZ or NiO-YSZ. Arrow 104 represents an influx of hydrocarbon with little to no water, with no carbon dioxide, and with no oxygen, and 105 represents an influx of water or water and hydrogen.

In this disclosure, no oxygen means there is no oxygen present at first electrode 101 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 101 is configured to receive methane and water or methane and carbon dioxide. In an embodiment, the fuel comprises a hydrocarbon having a carbon number in the range of 1-12, 1-10 or 1-8. Most preferably, the fuel is methane or natural gas, which is predominantly methane. In an embodiment, the device does not generate electricity. In an embodiment, the device comprises a mixer configured to receive at least a portion of the first electrode product and at least a portion of the second electrode product. The mixer may be configured to generate a gas stream in which the hydrogen to carbon oxides ratio is no less than 2, or no less than 3 or between 2 and 3. Such mixed gas streams, for example, are suitable as feed for Fischer Tropsch reactions/reactors.

In an embodiment, first electrode 101 or second electrode 102, or both the first electrode 101 and second electrode 102 comprise a catalyst and a substrate, wherein the mass ratio between the catalyst and the substrate is no less than 1/100, or no less than 1/10, or no less than 1/5, or no less than 1/3, or no less than 1/1. In an embodiment, the catalyst comprises nickel oxide, silver, cobalt, cesium, nickel, iron, manganese, nitrogen, tetra-nitrogen, molybdenum, copper, chromium, rhodium, ruthenium, palladium, osmium, iridium, or platinum, or combinations thereof. In an embodiment, the substrate comprises gadolinium, $CeO_2$, $ZrO_2$, $SiO_2$, $TiO_2$, steel, cordierite ($2MgO-2Al_2O_3-5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof. In some embodiments, first electrode 101 or second electrode 102, or both the first electrode 101 and second electrode 102, comprise a promoter wherein the promoter is selected from the group consisting of Mo, W, Ba, K, Mg, Fe, and combinations thereof. In an embodiment, an anode (e.g., the first electrode or the second electrode) comprises a catalyst, wherein the catalyst is selected from the group consisting of nickel, iron, palladium, platinum, ruthenium, rhodium, cobalt, and combinations thereof.

In some embodiments, the electrodes and electrolyte form a repeat unit. A device may comprise two or more repeat units separated by interconnects. In a preferred embodiment, the interconnects comprise no fluid dispersing element. In an embodiment, first electrode 101 or second electrode 102, or both the first electrode 101 and second electrode 102, comprise fluid channels. Alternatively, the first electrode 101 or second electrode 102, or both the first electrode 101 and second electrode 102, comprise fluid dispersing components.

The gas producer or hydrogen producer is not a fuel cell and does not generate electricity, in various embodiments. Electricity may be applied to the gas/hydrogen producer at the anode and cathode in some cases. In these cases, the electrolyte 103 is configured not to conduct electrons.

In other cases, electricity is not needed. In such cases, the electrolyte 103 is configured to conduct electrons and as such is different from the traditional meaning of electrolytes. In an embodiment, the device comprises no interconnect. In an embodiment, the electrolyte 103 conducts oxide ions and electrons. In an embodiment, the electrodes 101, 102 and the electrolyte 103 are tubular (see, e.g., FIGS. 2A and 2B). In an embodiment, the electrodes 101, 102 and the electrolyte 103 are planar. In these embodiments, the electrochemical reactions at the anode and the cathode are spontaneous without the need to apply potential/electricity to the reactor. In such cases, the interconnect is no longer needed, which significantly simplifies the device. In such cases, the electrolyte in the device conducts both oxide ions and electrons, or mixed conducting.

In an embodiment, the hydrogen producer (or EC gas producer) is a device comprising a first electrode, a second electrode, and an electrolyte between the electrodes, wherein the first electrode and the second electrode comprise a metallic phase that does not contain a platinum group metal when the device is in use, and wherein the electrolyte is oxide ion conducting. In an embodiment, wherein the first electrode comprises Ni or NiO and a material selected from the group consisting of YSZ, CGO, samaria-doped ceria (SDC), scandia-stabilized zirconia (SSZ), LSGM, and combinations thereof. In an embodiment, the first electrode is configured to receive a fuel and water or a fuel and carbon dioxide. In an embodiment, said fuel comprises a hydrocarbon or hydrogen or carbon monoxide or combinations thereof.

In an embodiment, the first electrode comprises doped or undoped ceria and a material selected from the group consisting of Cu, CuO, $Cu_2O$, Ag, $Ag_2O$, Au, $Au_2O$, $Au_2O_3$, stainless steel, and combinations thereof. In an embodiment, the first electrode is configured to receive a fuel with little to no water. In an embodiment, said fuel comprises a hydrocarbon or hydrogen or carbon monoxide or combinations thereof. In an embodiment, the second electrode comprises Ni or NiO and a material selected from the group consisting of yttria-stabilized zirconia (YSZ), ceria gadolinium oxide (CGO), samaria-doped ceria (SDC), scandia-stabilized zirconia (SSZ), lanthanum strontium gallate magnesite (LSGM), and combinations thereof. In an embodiment, the second electrode is configured to receive water and hydrogen and configured to reduce the water to hydrogen.

In an embodiment, the electrolyte comprises doped ceria or wherein the electrolyte comprises lanthanum chromite or a conductive metal or combination thereof and a material selected from the group consisting of doped ceria, YSZ, LSGM, SSZ, Sc and Ce doped zirconia, and combinations thereof. In an embodiment, the lanthanum chromite comprises undoped lanthanum chromite, strontium doped lanthanum chromite, iron doped lanthanum chromite, strontium and iron doped lanthanum chromite, lanthanum calcium chromite, or combinations thereof. In an embodiment, the conductive metal comprises Ni, Cu, Ag, Au, or combinations thereof.

In an embodiment, the first electrode 101 or second electrode 102 or both the first electrode 101 and second electrode 102 comprise fluid channels. Alternatively, the first electrode 101 or second electrode 102 or both the first electrode 101 and second electrode 102 comprise fluid dispersing components. In an embodiment, the electrodes and electrolyte 103 form a repeat unit and wherein a device comprises multiple repeat units separated by interconnects. In an embodiment, the interconnects comprise no fluid dispersing elements. In an embodiment, the electrodes 101, 102 and electrolyte 103 may be planar. Fluid dispersing components or fluid channels in the electrodes function to distribute fluids, e.g., reactive gases (such as methane, hydrogen, carbon monoxide, air, oxygen, steam etc.), in an electrochemical reactor. As such, traditional interconnects with channels are no longer needed. The design and manufacturing of such traditional interconnects with channels is complex and expensive. According to this disclosure, the interconnects are simply impermeable layers that conduct or collect electrons, having no fluid dispersing elements.

Figure 2A:
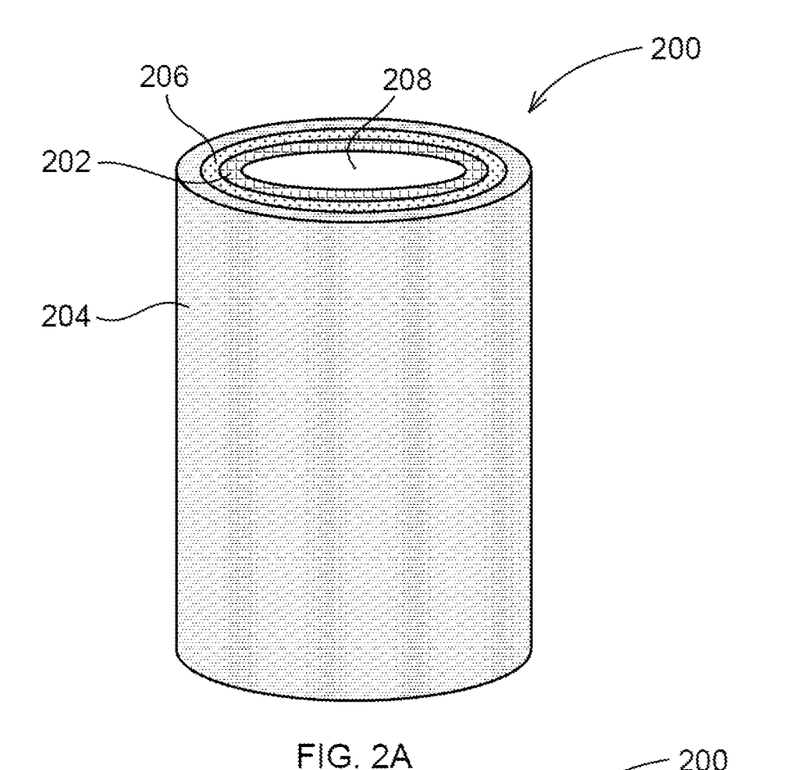
FIG. 2A illustrates a tubular hydrogen producer containing an oxide ion conducting membrane, according to an embodiment of this disclosure.
Figure 2B:
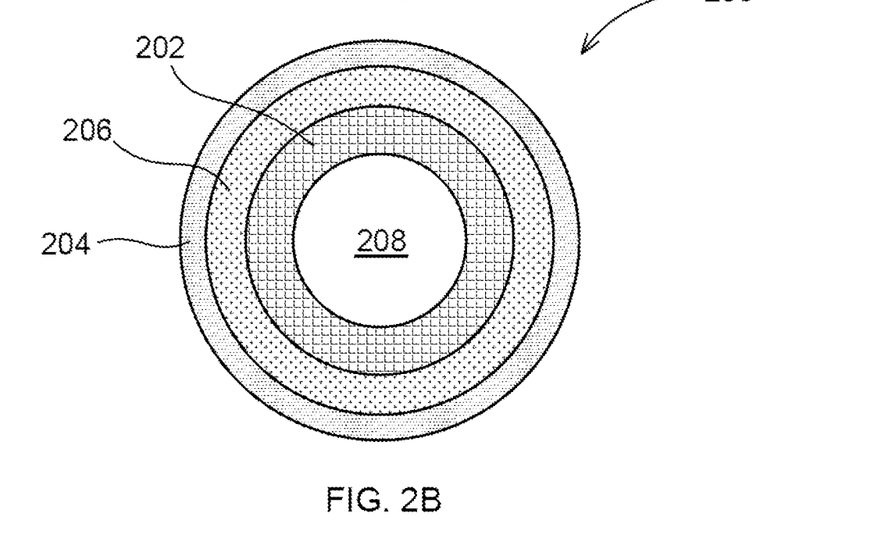
FIG. 2B illustrates a cross section of a tubular hydrogen producer comprising an oxide ion conducting membrane, according to an embodiment of this disclosure.

FIG. 2A illustrates (not to scale) a tubular hydrogen producer or an EC gas producer 200, according to an embodiment of this disclosure. Tubular producer 200 includes an inner tubular structure 202, an outer tubular structure 204, and an electrolyte 206 disposed between the inner and outer tubular structures 202, 204, respectively. In some embodiments, electrolyte 206 may instead comprise a membrane. Tubular producer 200 further includes a void space 208 for fluid passage. FIG. 2B illustrates (not to scale) a cross section of a tubular producer 200, according to an embodiment of this disclosure. Tubular producer 200 includes a first inner tubular structure 202, a second outer tubular structure 204, and an electrolyte 206 between the inner and outer tubular structures 202, 204. In some embodiments, electrolyte 206 may be referred to as a membrane. Tubular producer 200 further includes a void space 208 for fluid passage.

In an embodiment, the electrodes and the electrolyte are tubular with the first electrode being outermost and the second electrode being innermost, wherein the first electrode comprises doped or undoped ceria and a material selected from the group consisting of Cu, CuO, $Cu_2O$, Ag, $Ag_2O$, Au, $Au_2O$, $Au_2O_3$, stainless steel, and combinations thereof. In an embodiment, the electrodes and the electrolyte are tubular with the first electrode being outermost and the second electrode being innermost, wherein the second electrode is configured to receive water and hydrogen. In an embodiment, the electrodes and the electrolyte are tubular with the first electrode being innermost and the second electrode being outermost, wherein the second electrode is configured to receive water and hydrogen. In an embodiment, the electrodes and the electrolyte are tubular, wherein the first and second electrodes comprise Ni-YSZ or NiO-YSZ.

Hydrogen Production Method and System

Disclosed herein is a method comprising providing a device comprising a first electrode, a second electrode, and an electrolyte/membrane between the electrodes, introducing a first stream to the first electrode, introducing a second stream to the second electrode, extracting hydrogen from the second electrode, wherein the first electrode and the second electrode comprise a metallic phase that does not contain a platinum group metal when the device is in use. In an embodiment, the electrolyte/membrane is oxide ion conducting. In an embodiment, the electrolyte/membrane is mixed conducting. In an embodiment, the electrolyte/membrane also conducts electrons.

In an embodiment, the device is operated at a temperature no less than 500° C., or no less than 600° C., or no less than 700° C., or no less than 750° C., or no less than 800° C., or no less than 850° C., or no less than 900° C., or no less than 950° C., or no less than 1000° C. In various embodiment, the pressure differential between the first electrode and the second electrode is no greater than 2 psi, or no greater than 1.5 psi, or no greater than 1 psi. In an embodiment, the first stream enters the device at a pressure of no greater than 10 psi, or no greater than 5 psi, or no greater than 3 psi. In an embodiment, the second stream enters the device at a pressure of no greater than 10 psi, or no greater than 5 psi, or no greater than 3 psi.

In an embodiment, the first stream comprises a fuel and water or a fuel and carbon dioxide. In an embodiment, said fuel comprises a hydrocarbon or hydrogen or carbon monoxide or combinations thereof. In an embodiment, the first stream is directly introduced into the first electrode or the second stream is directly introduced into second electrode or both. In an embodiment, the method comprises providing a reformer upstream of the first electrode, wherein the first stream passes through the reformer before being introduced to the first electrode, wherein the first electrode comprises Ni or NiO. In an embodiment, the reformer is a steam reformer or an autothermal reformer.

In an embodiment, the first stream comprises a fuel with little to no water. In an embodiment, the fuel comprises a hydrocarbon or hydrogen or carbon monoxide or combinations thereof. In an embodiment, the second stream consists of water and hydrogen.

In an embodiment, said first stream comprises carbon monoxide and no significant amount of hydrogen or hydrocarbon or water. In such cases, an upstream reformer is not needed. In this disclosure, no significant amount of hydrogen or hydrocarbon or water means that the volume content of the hydrogen or hydrocarbon or water is no greater than 5%, or no greater than 3%, or no greater than 2%, or no greater than 1%, or no greater than 0.5%, or no greater than 0.1%, or no greater than 0.05%. In various embodiments, the first stream comprises no less than 50% of CO by volume, or no less than 60% of CO by volume, or no less than 70% of CO by volume, or no less than 80% of CO by volume, or no less than 90% of CO by volume. In an embodiment, the first stream comprises $CO_2$. In an embodiment, the second stream consists of water and hydrogen.

In an embodiment, the method comprises using the extracted hydrogen in one of Fischer-Tropsch (FT) reactions, dry reforming reactions, Sabatier reaction catalyzed by nickel, Bosch reaction, reverse water gas shift reaction, electrochemical reaction to produce electricity, production of ammonia, production of fertilizer, electrochemical compressor for hydrogen storage, fueling hydrogen vehicles or hydrogenation reactions or combinations thereof.

Herein disclosed is a method of producing hydrogen comprising providing a hydrogen producer, introducing a first stream comprising a fuel to the device, introducing a second stream comprising water to the device, reducing the water in the second stream to hydrogen, and extracting hydrogen from the device, wherein the first stream and the second stream do not come in contact with each other in the device. In an embodiment, the first stream does not come in contact with the hydrogen. In an embodiment, the first stream and the second stream are separated by a membrane in the device.

In an embodiment, the fuel comprises a hydrocarbon or hydrogen or carbon monoxide or combinations thereof. In an embodiment, the second stream comprises hydrogen. In an embodiment, the first stream comprises the fuel and water or the fuel and carbon dioxide. In an embodiment, the first stream comprises the fuel with little to no water.

In an embodiment, the fuel consists of carbon monoxide. In an embodiment, the first stream consists of carbon monoxide and carbon dioxide. In an embodiment, the second stream consists of water and hydrogen. In an embodiment, the second stream consists of steam and hydrogen.

Figure 3:
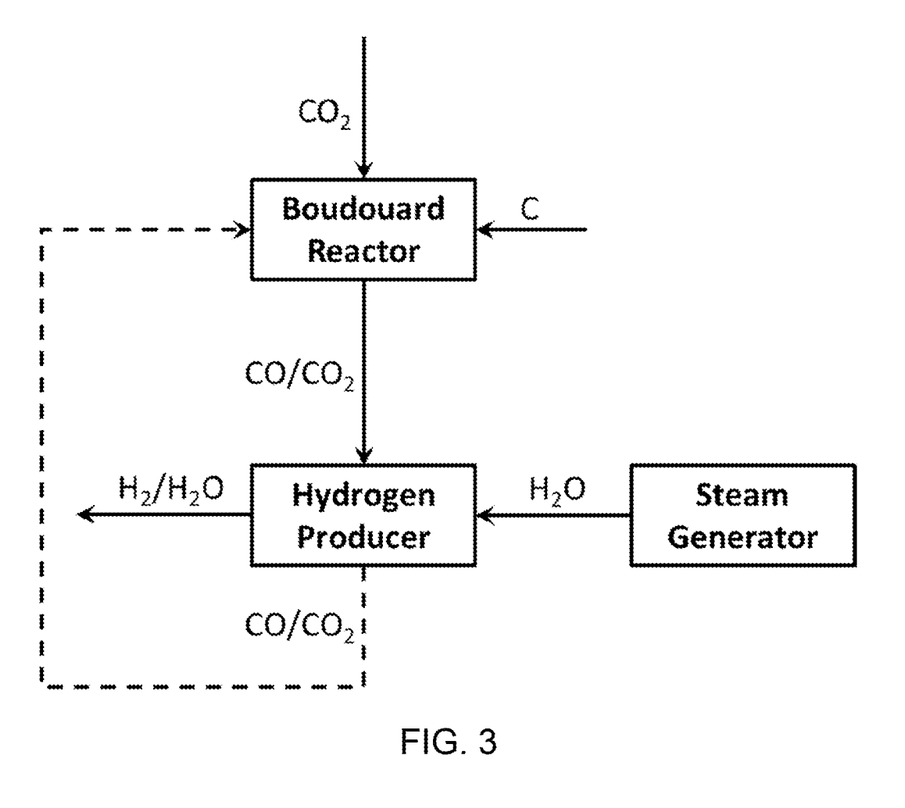
FIG. 3 illustrates a hydrogen production system, according to an embodiment of this disclosure.

As illustrated in FIG. 3, a hydrogen production system is shown. In an embodiment, the system comprises a Boudouard reactor; a steam generator; and a hydrogen producer; wherein the Boudouard reactor provides CO to the hydrogen producer and the steam generator provides steam to the hydrogen producer; and wherein CO and steam do not come in contact with each other in the hydrogen producer. In various embodiment, the pressure differential between the CO side and the steam side is no greater than 2 psi, or no greater than 1.5 psi, or no greater than 1 psi.

Carbon and carbon dioxide react in the Boudouard reactor and generate CO. In various embodiments, carbon is sourced from coal, coke, soot, graphene, graphite, carbon black, hydrocarbon pyrolysis, biomass, biochar, or combinations thereof. In various embodiments, $CO_2$ is sourced from an exhaust stream of power generation, a carbon capture process, compressed gas, $CO_2$ tank, or combinations thereof. A $CO/CO_2$ mixture enters the hydrogen producer from the Boudouard reactor. The Boudouard reactor is operated at a temperature of no less than 700° C., or no less than 800° C., or no less than 850° C., or no less than 900° C., or no less than 950° C., or no less than 1000° C. The gas feed into the hydrogen producer from the Boudouard reactor has a temperature of no less than 700° C., or no less than 800° C., or no less than 850° C. The gas feed into the hydrogen producer from the Boudouard reactor has a pressure of no greater than 10 psi, or no greater than 5 psi, or no greater than 3 psi.

The steam generator produces steam from water. In an embodiment, the steam that enters the hydrogen producer has a temperature of no less than 600° C., or no less than 700° C., or no less than 800° C., or no less than 850° C., or no less than 900° C., or no less than 950° C., or no less than 1000° C., or no less than 1100° C. In an embodiment, the steam that enters the hydrogen producer has a pressure of no greater than 10 psi, or no greater than 5 psi, or no greater than 3 psi.

In an embodiment, the hydrogen producer generates a first product stream comprising CO and $CO_2$ and a second product stream comprising $H_2$ and $H_2O$, wherein the two product streams do not come in contact with each other. In an embodiment, a portion of the first product stream is recycled to enter the Boudouard reactor. In an embodiment, a portion of the second product stream is recycled to enter the hydrogen producer. In an embodiment, the system comprises a carbon capture unit configured to provide $CO_2$ to the Boudouard reactor. In an embodiment, the system comprises a carbon capture unit configured to at least partially separate and capture $CO_2$ from the first product stream of the hydrogen producer.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method comprising: providing an oxide ion conducting and electron conducting membrane; exposing the membrane to a reducing environment on both sides of the membrane during the entire time of operation, wherein the operation does not receive electricity or generate electricity.

2. The method of claim 1, wherein the membrane comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof.

3. The method of claim 2, wherein the lanthanum chromite comprises undoped lanthanum chromite, strontium doped lanthanum chromite, iron doped lanthanum chromite, strontium and iron doped lanthanum chromite, lanthanum calcium chromite, or combinations thereof.

4. The method of claim 1, wherein the membrane is mixed conducting.

5. The method of claim 1, wherein one side of the membrane is in contact with a cathode at which steam is reduced to produce hydrogen.

6. The method of claim 5, wherein steam is electrochemically reduced to hydrogen.

7. The method of claim 5, wherein the cathode comprises Ni or Ni0 and a material selected from the group consisting of YSZ, CGO, SDC, SSZ, and combinations thereof.

8. The method of claim 5, wherein the opposite side of the membrane is in contact with an anode that receives a fuel, wherein the fuel does not mix with water-hydrogen directly.

9. The method of claim 8, wherein the anode comprises Ni or NiO and a material selected from the group consisting of YSZ, CGO, SDC, SSZ, LSGM, and combinations thereof; or alternatively the anode comprises doped or undoped ceria and a material selected from the group consisting of Cu, CuO, $Cu_2O$, Ag, $Ag_2O$, Au, $Au_2O$, $Au_2O_3$, Pt, Pd, Ru, Rh, Ir, LaCaCr, LaSrCrFe, YSZ, CGO, SDC, SSZ, LSGM, stainless steel, and combinations thereof.

10. The method of claim 8, wherein the anode comprises lanthanum chromite and a material selected from the group consisting of doped ceria, yttria-stabilized zirconia (YSZ), lanthanum strontium gallate magnesite (LSGM), scandia-stabilized zirconia (SSZ), Sc and Ce doped zirconia, and combinations thereof; wherein optionally the lanthanum chromite comprises undoped lanthanum chromite, strontium doped lanthanum chromite, iron doped lanthanum chromite, strontium and iron doped lanthanum chromite, lanthanum calcium chromite, or combinations thereof.

11. The method of claim 5, wherein the cathode also receives hydrogen as input.

\* \* \* \* \*

UNITED STATES PATENT AND TRADEMARK OFFICE
CERTIFICATE OF CORRECTION

PATENT NO. : 11,777,126 B2
APPLICATION NO. : 17/111602
DATED : October 3, 2023
INVENTOR(S) : Nicholas Farandos, Matthew Dawson and Jin Dawson It is certified that error appears in the above-identified patent and that said Letters Patent is hereby corrected as shown below:

In the Claims

Column 14, Claim 7, Line 50, "Ni0" should read -- NiO --.

Signed and Sealed this
Thirty-first Day of October, 2023

Katherine Kelly Vidal
*Director of the United States Patent and Trademark Office*